United States Patent Office 3,493,271
Patented Feb. 3, 1970

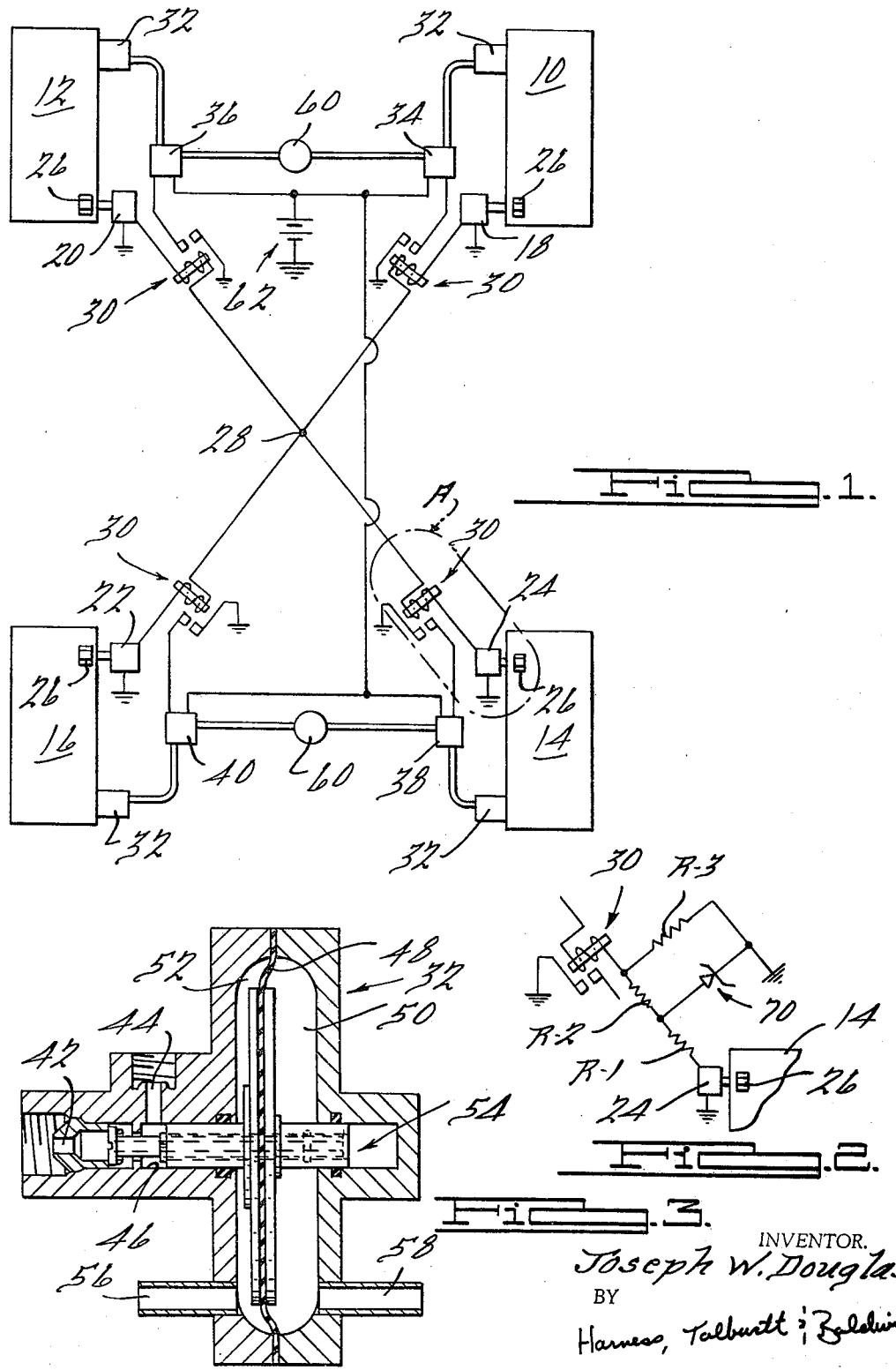

3,493,271
ANTI-SKID SYSTEM
Joseph W. Douglas, Southfield, Mich., assignor to Chrysler Corporation, Highland Park, Mich., a corporation of Delaware
Filed Oct. 23, 1967, Ser. No. 677,428
Int. Cl. B60t 8/08
U.S. Cl. 303—21                                    2 Claims

ABSTRACT OF THE DISCLOSURE

A system for detecting the "lock-up" or skidding of one or more wheels of a vehicle and for automatically effecting a reduction in the brake applying pressure acting on the skidding wheel. The system comprises a sensing circuit which determines if a skid is occurring, or about to occur, and a hydraulic pressure reducing device which lowers the brake hydraulic pressure until the wheel or wheels revolve freely. The sensing circuit comprises a signal generating device associated with each wheel of the vehicle, with the output of all generators meeting at a common terminal. Normally, the generators oppose each other and no current will flow in the circuit. If one or more wheels skid, then current from the generator or generators associated with the revolving wheels will flow through the common terminal towards the generator of the skidding wheel and energize a polarity sensitive relay. Energization of the relay results in actuation of a pressure reducer valve to reduce the brake applying pressure until the wheel or wheels revolve.

BACKGROUND OF THE INVENTION

The present invention relates to motor vehicle braking systems and more particularly to a brake anti-skid system for automatically reducing the application of braking force to a wheel whenever the wheel "locks" or skids.

It is now well established that the lock-up or skidding of one or more wheels of a vehicle results in loss of directional control and greatly increases the distance required to stop the vehicle. Accordingly, it is necessary that the wheels of a vehicle have a rotating condition relative to the road if maximum braking and vehicle control is to be obtained. Heretofore, various systems which are responsive to the slipping of a vehicle wheel have been proposed for the purpose of effecting a reduction in the braking pressure applied to that wheel. Generally, all such systems consist of two basic parts. One part comprises a control system which is employed to determine if a skid is occurring or about to occur. The second part is a pressure reducing device which lowers the brake hydraulic pressure until the wheel or wheels revolve freely. The pressure reducer device is usually interconnected with the hydraulic brake line running to one or more wheels and generally comprises some type of a pneumatically controlled valve. On receiving a signal from the control system that a wheel is skidding, a valve is actuated directing air to the pressure reducer, and a piston component of the reducer is caused to move. The first portion of the piston travel cuts off fluid from the master cylinder to the wheel brake cylinder and further travel increases the volume in the brake circuit, between the pressure reducer and the brake mechanism of the skidding wheel, causing the hydraulic pressure to drop until the wheel revolves freely. With the wheel revolving, the control system reverses and hydraulic pressure is once more applied to the wheel brake mechanism. If the wheel again skids, the whole process is repeated until the vehicle is at rest.

It is apparent from the foregoing that the success or failure of an anti-skid system is largely dependent on the control means, as it must first detect a skid condition and then produce a signal to actuate some type of pressure reducer. In general, the earlier systems employed an inertia mass, as for example in the form of a flywheel, which was driven off some portion of the vehicle drive train. As a wheel skidded slowing down or halting the drive train, the flywheel would continue to revolve and actuate a switch or valve for actuation of the pressure reducer. This approach is now generally considered obsolete as it did not give consistent results owing to the various forces acting on the vehicle and was slow in responding to a skid condition. Accordingly, those in the art have now turned to the use of electrical control systems. Unfortunately, however, the electrical sensing systems now known are extremely complicated, delicate and expensive to install and service. Thus, many such systems have been designed for use with aircraft wherein space and cost considerations are not severe limitations as with automotive vehicles. Moreover, the highly trained operating personnel and regular expert maintenance associated with aircraft permit the use of electronic anti-skid control systems which are not adaptable to automobiles because of the lack of these factors. Yet another major deficiency of heretofore known electronic sensing systems is that they are capable of monitoring only two or three wheels of a four wheel vehicle, since one of the vehicle wheels must generally be used to provide a comparison signal by which the performance of the other wheels may be measured. Accordingly, each wheel is not subjected to anti-skid control.

SUMMARY OF THE INVENTION

From the foregoing, it will be recognized that an anti-skid system is needed having a wheel sensing circuit which is capable of directly sensing the skidding of each wheel of the vehicle and translating this information into a braking pressure shut-off function. Moreover, the sensing arrangement must be rugged enough to withstand hard usage with a minimum of maintenance.

Accordingly, it is an object of this invention to provide an improved vehicle wheel anti-skid system.

A further object of this invention is to provide an anti-skid system having means for sensing the rotation of each wheel, means for determining when a wheel is in a skid condition, and means for reducing the application of braking force to the skidding wheel.

Another object of the invention is the provision of a rugged wheel sensing circuit utilizing individual wheel sensors for producing signals which can be directly employed to actuate braking pressure control devices.

Other objects and advantages of the invention will become apparent in conjunction with the appended claims and the description of the presently preferred embodiment of the invention illustrated in the drawing.

Briefly, the present invention comprises valve means for reducing the brake pressure applied to a slipping wheel, control means for controlling the operation of the valve means, and a sensing circuit responsive to wheel slip for actuating the control means. The sensing circuit includes a source of electrical potential and signal means, such as a generator, associated with each vehicle wheel for producing an output signal or current in response to rotation of the wheel. The signal means are all interconnected at a common terminal such that the output signals normally oppose and cancel each other out. Switch means are connected between each generator and the common terminal for actuating the control means. In the event of the skidding of one or more vehicle wheels, the generator of the skidding wheel no longer produces a voltage and the output from the other generators will cause current to flow through the common terminal towards the generator of the skidding wheel. The switch means are such that current flowing away from the generator has no effect upon them, while current flowing towards the generator cause the switch means to close. Such actuation of the switch means connects the source of electrical potential with the control means, which, in turn, causes actuation of the pressure reducer valve means. One generator will provide sufficient current to actuate the switch means associated with the other generators and, hence, the anti-skid system will function, even upon locking of all but one vehicle wheel. In addition, this invention provides for the employment of a constant voltage circuit in conjunction with each of the generators to compensate for voltage variations arising from generator output tolerances or normal variations due, for example, to the difference in speed of the various wheels during execution of a turn.

DESCRIPTION OF THE DRAWINGS

In the accompanying drawing, in which two of the various possible embodiments are illustrated, FIGURE 1 is a diagrammatic showing of one embodiment of the invention;

FIGURE 2 is a view similar to the area designated as "A" in FIGURE 1, showing a modified embodiment of the invention wherein a constant voltage circuit is interconnected with the output from the signal means, and FIGURE 3 is a cross-sectional view of a pressure reducer valve which can be employed in this invention.

Like parts are indicated by corresponding reference characters throughout the several views of the drawing.

DESCRIPTION OF THE PREFERRED EMBODIMENTS

The anti-skid system of this invention will be described in relation to a vehicle equipped with a hydraulic brake system although it should be understood that the invention can be used equally as well in conjunction with other brake systems such as air brakes. In the accompanying drawing, a typical vehicle is illustrated in FIGURE 1 having front wheels 10 and 12 and rear wheels 14 and 16. Each wheel is provided with a hydraulically operated drum or disc brake (not shown) which is operable for normal braking by a conventional hydraulic system.

Signal means are associated with each wheel to produce a signal proportional to wheel speed and can be of any suitable kind, producing a signal resulting from, for example, a change in capacitance, inductance, resistance or voltage either A.C. or D.C. Naturally, if the signal from the signal producing means is other than D.C. then it must be converted to a D.C. voltage. In the preferred embodiment of this invention, each D.C. tachometer generators 18, 20, 22 and 24 is driven by an associated wheel 10, 12, 14 and 16, respectively, by means of gearing 26 to provide a signal which varies as a function of the rotational speed of the associated wheel. All of the generators are interconnected at a common point or mixing junction 28 and switch means, such as polarity sensitive relays 30, are located in the circuit so that between each generator and the mixing junction 28 there is a relay 30.

Each of the vehicle wheels 10, 12, 14 and 16 is provided with valve means such as a pressure reducer valve 32, and the valve 32 is positioned in the brake line (not shown) to each wheel between the master cylinder and the brake cylinder of the wheel brake mechanism. An electrical current responsive control means such as a solenoid valve 34, 36, 38 and 40 is associated with each of the pressure reducer valves 32 and controls the operation thereof and described hereinafter.

Generally, any type of pressure reducer valve now used in anti-skid devices can be employed in the anti-skid system of this invention. However, excellent results have been achieved through the use of the pressure reducer valve 32 shown in FIGURE 3 and which is the subject of my copending U.S. patent application. The pressure reducer valve 32 is provided with an inlet port 42 adapted to be connected with a brake line conduit from the master cylinder (not shown), and an outlet port 44 in communication with a bore 46 adapted for connection with a wheel brake cylinder (not shown). A diaphragm member 48 divides a cavity into two chambers 50 and 52 and a piston assembly 54 is slidably disposed in the bore 46 and carried by the diaphragm 48. Normally, as seen in FIGURE 3, chamber 52 is maintained at a pressure less than atmospheric and chamber 50 at atmospheric pressure by means of the associated solenoid valve (FIGURE 1) which interconnects a vacuum source with chambers 50 and 52 by means of ports 56 and 58, respectively. The vacuum can be supplied by any source such as the engine intake manifold or a vacuum reservoir 60 (FIGURE 1) and the solenoid valve is capable of switching or applying vacuum to the opposite side of the diaphragm 48 in response to indicia of wheel skidding. Accordingly, it will be understood that a partial pressure or vacuum can be selectively applied in either of chambers 50 and 52 to provide the necessary pressure differential across the diaphragm 48 so as to control movement of the piston assembly 54.

During normal braking operation, when no wheel lock or skidding is encountered, the solenoid valve connects chamber 52 with vacuum reservoir 60 via port 56, while chamber 50 has atmospheric pressure communicated to it through port 58. Accordingly, diaphragm 48 is held in a position as shown in FIGURE 3 and maintains piston assembly 54 in a position such that brake fluid can pass through the pressure reducer valve 32. It will also be apparent that during normal brake operation with all the wheels revolving, each generator 18, 20, 22 and 24 produces essentially equal output. Therefore, no current flows through the mixing junction 28. Likewise, polarity sensitive relays 30 are employed so that the relay will not close when current flows away from the associated generator.

It will now be assumed that the vehicle brakes are applied and one the vehicle wheels 12 skids and ceases to rotate. At this instant, the voltage output of generator 20 will cease and current will flow from generators 18, 22 and 24 through mixing junction 28 and towards generator 20. Due to the use of polarity sensitive relays 30, only the relay 30 associated with generator 20 will close. Activation of this relay thereby energizes solenoid valve 36 by completing a circuit from battery 62 through solenoid valve 36 and to ground through relay 30. In turn, energization of solenoid valve 36 causes it to switch application of the vacuum reservoir 60 to the opposite side of the diaphragm 48 of the pressure reducer valve 32, and admit atmospheric pressure to its other side. Under these conditions, the diaphragm 48 will be forced to the right with reference to FIGURE 3 and such diaphragm movement will carry the piston assembly 54 to the right. This movement of the piston assembly will block communication between the inlet port 42 and outlet port 44 and prevent any increase in hydraulic pressure from being transmitted to the associated wheel brake cylinder of wheel 12. In addition, this movement of the piston assembly increases the volume of that portion of the bore 46 which is in communication with outlet port 44, thereby causing the hydraulic pressure in the brake line to the associated wheel brake cylinder to drop so as to enable the wheel to revolve freely.

As soon as the skidding wheel resumes revolving, the generator 20 will transmit an output voltage to the mixing junction 28 and the sensing circuit will return to a balanced condition across the mixing junction 28 with no current flow. Accordingly, relay 30 will open, breaking the circuit connecting the battery 62 with the solenoid valve 36, and causing the valve 36 to reverse the pressures on the diaphragm thereby again establishing communication between the inlet and outlet ports of the pressure reducer valve 32. The cycle of operation is then repeated if the associated wheel enters another skid condition. It has been found that the output from any single generator was sufficient to cause actuation of the pressure reducer valve associated with the other three vehicle wheels, in the event of their simultaneous skidding.

It will be apparent that there will be voltage output variations among the generators due to factors such as output tolerances of the generator and the normal difference in speed of the vehicle wheels during execution of a turn. Accordingly, it is preferable to employ a circuit in conjunction with each of the generators which will give a substantially constant voltage and current output across the associated relay 30 and mixing junction 28. Such a circuit which has given excellent results is shown in FIGURE 2 wherein a Zener diode 70 and a resistor R–1 forms a shunt regulator on the generator output and resistors R–2 and R–3 constitute a voltage divider in parallel with the diode 70. Thus for example, when each of the resistors R–1, R–2 and R–3 were 10 ohms and the relay 30 of 350 ohms resistance, it was found that the generator output voltage could vary between 1.2 and 9.6 volts while still maintaining a constant 0.4 volt across the relay 30. It will be understood, of course, that other voltage regulator circuits can be used in this invention and that other diode or transistor components could be used in place of the Zener diode illustrated in FIGURE 2.

In view of the foregoing it is apparent that the several objects and other advantages of this invention have been achieved. A highly effective anti-skid system has been provided utilizing a rugged inexpensive and simple electrical sensing circuit.

I claim:

1. In a vehicle having a plurality of independently rotatable brake equipped wheels, an anti-skid system for controlling the application of braking effect to one or more wheels upon their reaching a certain level of slip, said anti-skid system comprising valve means for reducing brake pressure to at least one of the slipping wheels, electrical current responsive control means for controlling the operation of said valve means, and a sensing circuit for determining wheel slip and for actuating said control means, said sensing circuit comprising a source of electrical potential, signal generator means associated with each vehicle wheel for producing an output signal in response to rotation of said wheel, a mixing junction interconnecting the signal generator means in opposition to each other for energization of said control means when the output signal of any one of said signal generator means differs from the output signals of the other signal generator means by a predetermined amount, signal relay means for each signal generator means, each of said signal relay means connected in series energizing circuit between its respective signal generator means and said mixing junction and including switch means operative in response to energization of its signal relay means for completing an electrical circuit connecting said source with said valve control means, and a constant voltage circuit for each signal generator means to provide a substantially constant output signal therefrom during periods of normal non-skid brake application and comprising a Zener diode and resistor shunt regulator across each signal generator means and a voltage divider in parallel with said diode.

2. An anti-skid system according to claim 1 wherein said valve means comprises a housing having a fluid inlet, a fluid outlet, a pressure differential operated diaphragm, a pressure control chamber intermediate the inlet and outlet, a piston assembly movably disposed in the chamber for regulating the volume thereof, the piston assembly being movable in response to movement of the diaphragm and the diaphragm being movable upon energization of the electrical current responsive control means.

References Cited

UNITED STATES PATENTS

| | | |
|---|---|---|
| 3,235,036 | 2/1966 | Meyer et al. |
| 3,260,555 | 7/1966 | Packer. |
| 3,260,556 | 7/1966 | Packer. |
| 3,338,637 | 8/1967 | Harned et al. |

DUANE A. REGER, Primary Examiner

U.S. Cl. X.R.

188—181